Figures 1, 5:
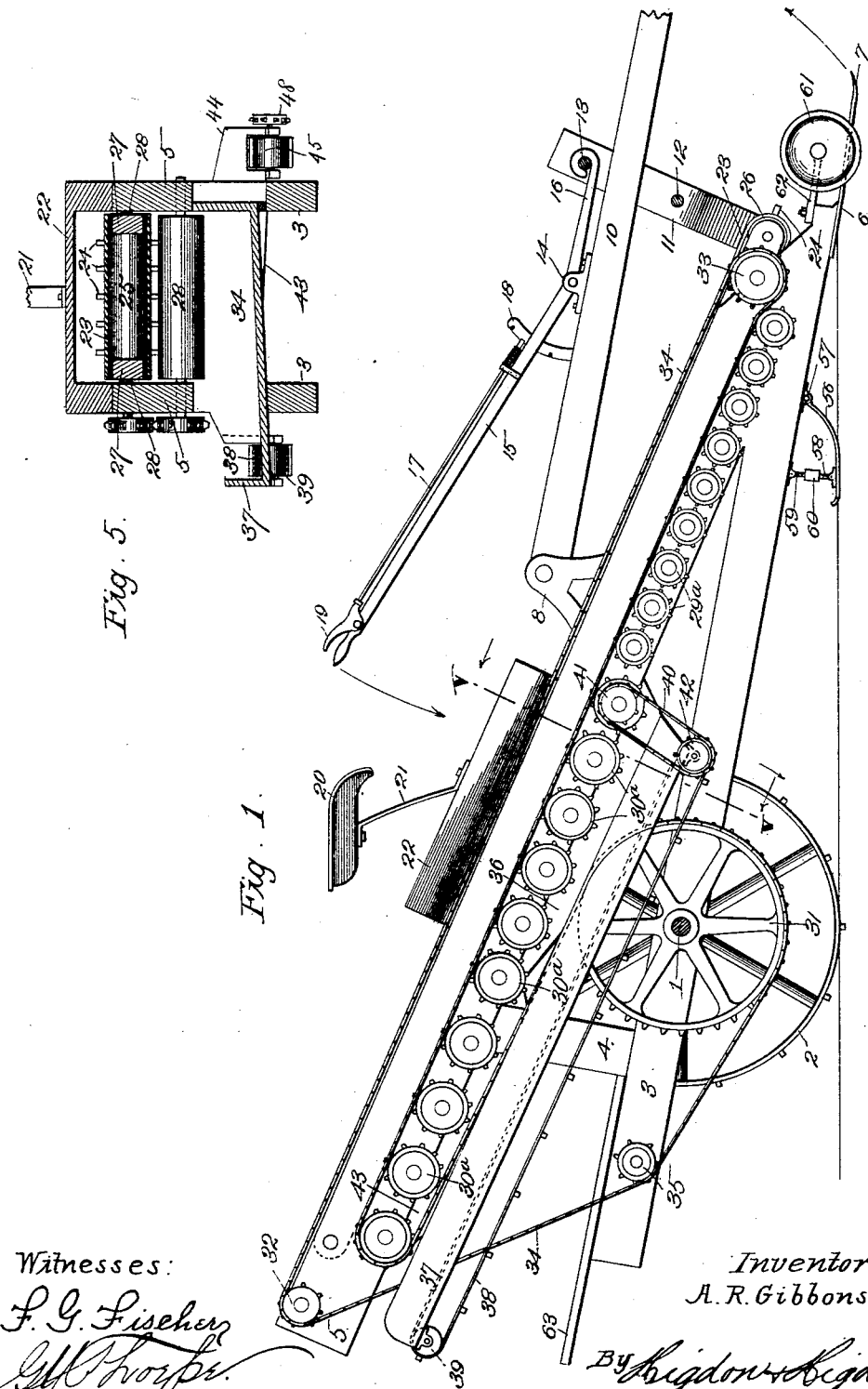

(No Model.) 2 Sheets—Sheet 1.

A. R. GIBBONS.
POTATO DIGGING MACHINE.

No. 587,725. Patented Aug. 10, 1897.

Witnesses:
F. G. Fischer
G. H. Thorpe

Inventor:
A. R. Gibbons
By Rigdon & Rigdon
Attys.

(No Model.) 2 Sheets—Sheet 2.
A. R. GIBBONS.
POTATO DIGGING MACHINE.
No. 587,725. Patented Aug. 10, 1897.
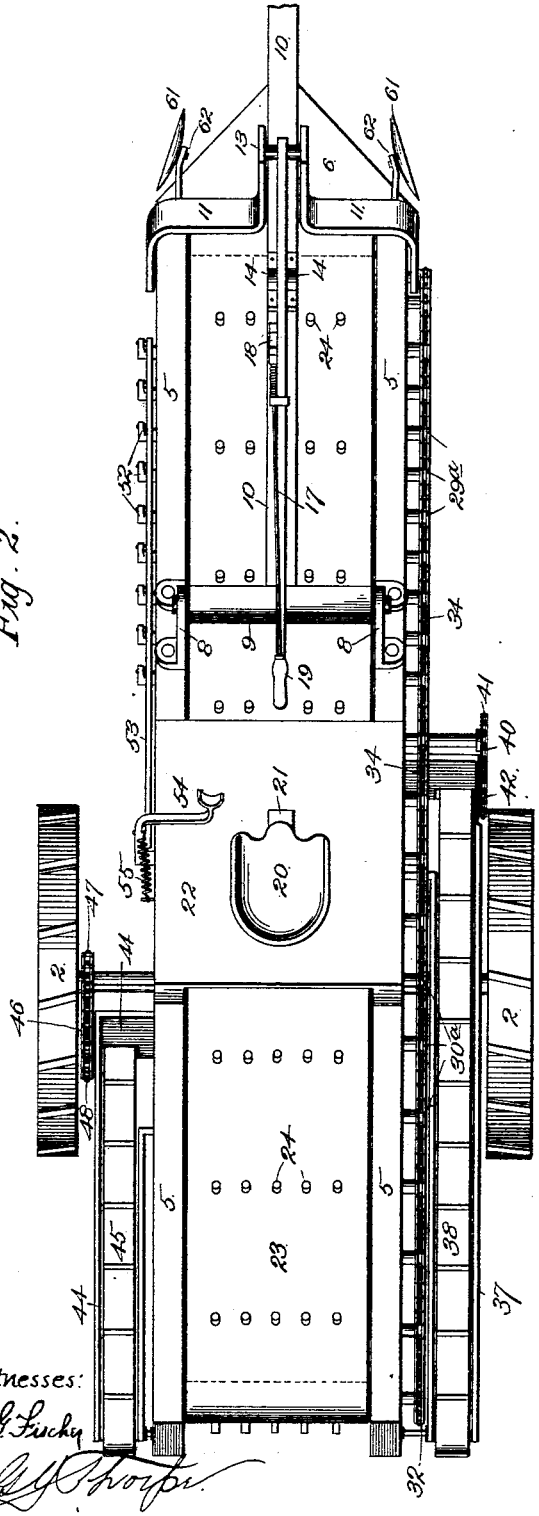
Witnesses:
F. G. Fischy
G. P. Thorpe
Inventor:
A. R. Gibbons
By Higdon & Higdon
Attys.

UNITED STATES PATENT OFFICE.

ALFRED R. GIBBONS, OF SHELBINA, MISSOURI.

POTATO-DIGGING MACHINE.

SPECIFICATION forming part of Letters Patent No. 587,725, dated August 10, 1897.

Application filed September 22, 1896. Serial No. 606,639. (No model.)

*To all whom it may concern:*

Be it known that I, ALFRED R. GIBBONS, of Shelbina, Shelby county, Missouri, have invented certain new and useful Improvements in Potato-Digging Machines, of which the following is a full, clear, and exact description, reference being had to the accompanying drawings, forming a part thereof.

My invention relates to potato-diggers; and it consists in certain peculiar and novel features of construction and combinations of parts, which will be hereinafter described and claimed.

The object of the invention is to produce a machine of this character which is positive and reliable in operation and which at all times is under perfect control of the driver.

In order that the invention may be fully understood, I will proceed to describe it with reference to the accompanying drawings, in which—

Figure 1 represents, partly in side elevation and partly in section, a potato-digger constructed in accordance with my invention. Fig. 2 represents a top plan view of the same. Fig. 3 represents, in detail, a part of the apparatus. Fig. 4 represents a detail sectional view of part of the potato-elevating mechanism. Fig. 5 is a cross-section taken on the line V V of Fig. 1.

Similar reference-numerals designate corresponding parts in all of the figures, in which—

1 designates the axle, and 2 the drive or supporting wheels, which are mounted upon said axle to rotate it when the machine is drawn forward and to rotate loosely upon it when the machine is backed in the customary manner.

The framework of the machine comprises the oppositely-disposed longitudinal timbers 3, journaled a suitable distance from their rear ends upon the axle, the upwardly-projecting beams or standards 4 upon said beams 3 rearward of the axle, preferably, and the downwardly and forwardly inclined timbers 5, which are secured in any suitable manner to the timbers 3 at their front ends and near their rear ends upon said standards 4. In side elevation the said frame as thus constructed is approximately of inverted-A shape. Bolted or otherwise suitably secured to the front end of said inclined frame is the V-shaped plow or scoop 6, which is adapted as the machine is drawn over the field to gather up the potatoes, and to do this more effectively the point of said plow or scoop is curved slightly upward, as shown at 7.

A suitable distance from the front end of the machine a pair of plates 8 are bolted to the side timbers 5 and are connected by the pivoted cross-bar 9, which carries rigidly the tongue 10, to which the draft-animals are attached in the customary manner. At the front end of the machine a pair of approximately Z-shaped angle plates or castings 11 are pivotally mounted, and the upper parallel portions of said angle-brackets are connected below and above said tongue, respectively, by the tie-bolts 12 and 13. Rearward of said brackets, which thus form a guide to prevent lateral movement or play of the tongue, bearing-boxes 14 are mounted upon the tongue, and pivotally carried thereby is a lever 15, provided with a forward extension or hook 16, engaging the upper tie-bolt 13 of said bracket. Said lever carries a spring-actuated dog 17 of the customary construction, which is adapted to engage one or another of a series of notches in a sector 18, carried by the tongue, and in order that said dog may be conveniently operated it is provided with the customary grip-handle 19, pivotally mounted upon the lever 15. Said lever projects within convenient reach of the driver upon the seat 20, carried by the standard 21, bolted to the platform or bridge 22, which connects the side timbers 5, as shown most clearly in Fig. 2. Extending parallel with and between said timbers 5, and therefore inclining downwardly and forwardly, is an endless elevator-belt 23, provided with transverse series of pins or teeth 24. Said belt is mounted at its upper or rear end upon the transverse roller 25, and at its front end upon the transverse roller 26. The roller 25 is journaled in the timbers 5, while the roller 26 is journaled in the front end of the vertically-swinging frame 27, said frame being arranged between and pivoted to the timbers 5 near their rear ends, as shown at 28. By this arrangement it is obvious that the front end of the endless belt may have a limited vertical movement to accommodate potatoes of different sizes, as will hereinafter appear.

29 designates a series of transverse rollers which are journaled in said timbers 5 below and parallel with the normal position of the endless belt. Said series of rollers extend from a point a slight distance rearward of the roller 26 about one-third of the length of the machine.

30 designates a second series of rollers which extend from a point adjacent to the rearmost roller of the first series nearly to the rear end of the machine. Said rollers are journaled, preferably, in a plane somewhat lower than the plane of the series of rollers 29, and in order that they shall occupy the same horizontal plane as the upper surfaces of the rollers 29 they are of greater diameter, as shown most clearly in Fig. 4.

The rollers 29 are arranged sufficiently near together to prevent any potatoes falling down between them, and the first half of the second series of rollers are arranged a greater distance apart, being adapted to permit of the escape between them of potatoes of smaller size, while the last half of said series are arranged a still greater distance apart in order that all of the potatoes remaining may drop between them.

29$^a$ and 30$^a$ designate sprocket-wheels on the extended spindles of rollers 29 and 30, respectively. In order to operate said rollers, the following mechanism is employed:

31 designates a master sprocket-wheel, which is mounted rigidly upon the axle of the vehicle.

32 designates a smaller sprocket-wheel, which is mounted rigidly upon the end of the spindle of the roller 25, and 33 a larger sprocket-wheel, which is mounted rotatably upon a stub-shaft projecting from the front end of the framework, said sprocket-wheels 31, 32, and 33 being mounted in the same vertical plane as the sprocket-wheels 29$^a$ and 30$^a$.

34 designates an endless sprocket-chain which connects sprocket-wheels 31, 32, and 33 and engages all of the sprocket-wheels 29$^a$ and 30$^a$. It also is engaged by the guide sprocket-wheel 35. By this arrangement it is obvious that the movement of the drive-wheels is imparted continuously to the series of rollers 29 and 30 in the direction indicated by the arrows, Fig. 4, and to the superposed belt 23.

36 designates a hopper which is mounted below the first half of the rollers 30 to receive all of the potatoes which fall between said rollers and conduct them laterally and deliver them into the longitudinally-extending elevator casing or spout 37, supported in any suitable manner at the outside of the chain 34 and arranged at an inclination about the same as the timbers 5. The bottom of this elevator casing or spout is swept by the endless conveyer or belt 38, which engages at its upper end the guide-roller 39 and at its lower end a similar guide-roller, said rollers being journaled in bearings depending from said elevator casing or spout. Motion is imparted to said belt through the medium of the endless chain 40, which connects the small sprocket-wheel 41 upon the spindle of one of the rollers 30 with a similar sprocket-wheel 42 upon one of the spindles of the roller at the lower or receiving end of the elevator-casing 37.

43 designates a hopper similar to the hopper 36. It is secured to the timbers 5 below the second half of the rollers 30, and is adapted to receive all of the potatoes which do not pass between the first half of said rollers. Said hopper delivers into the casing 44 at the opposite side of the machine from the casing 37, and said casing also is arranged at an inclination corresponding to that of the timbers 5, preferably. The bottom of this casing is swept by an endless belt 45, mounted in the customary manner upon rollers (not shown) at its opposite ends. It is driven by an endless chain 46, engaging sprocket-wheels 47 and 48 upon the extended spindle of one of the rollers 30 and the lower roller (not shown) of the belt 45, respectively.

When the ground is moist or damp, the rollers 29 and 30 are apt to get clogged up with mud, which is carried up with the potatoes and therefore interferes with the proper operation of the machine. To obviate this difficulty and keep the machine clean at all times, I have provided a roller-scraping mechanism consisting of a series of shafts 49, which are mounted below said rollers and are journaled in suitable bearing-boxes 50, secured to the under side of the timbers 5. Said shafts are provided between said timbers with the scraping-plates 51, which are equal in length to the rollers and are adapted to be held into frictional engagement therewith and externally of the casing with the arms 52 extending quartering to the said scraping-plates. The upper ends of the arms 52 are connected pivotally to a link 53, pivotally connected in turn at its upper end to a foot-lever 54, suitably mounted at its lower end and arranged within convenient reach of the driver. A retractile spring 55 is connected at its opposite ends to said lever and to a stationary point of the framework and normally holds said scraping-plates out of contact with said rollers.

When it is necessary to prevent the accumulation of earth upon said rollers, the driver presses his foot more or less forcibly upon the foot-lever 54 and thereby places the scraping-plates in operative relation to said rollers.

In order to maintain the point of the plow or scoop 6 at the proper depth and to support the front end of the machine, I employ the runners 56, pivotally connected, as at 57, to the framework at their front ends and adjustably connected also to the framework at their rear ends through the medium of the threaded stems 58 and 59, pivotally connected, respectively, to said runners and the framework, and a nut or turnbuckle 60, which connects said stems. By turning said nut or turnbuckle in one direction or the other the depth of cut by the plow or scoop may be regulated.

61 designates a pair of rotary soil-cutters or deflector-wheels, which are journaled rotatably in the supporting arms or brackets 62, bolted to the front end of the machine at opposite sides of the plow or scoop. These wheels rotate by means of their frictional contact with the ground, which they cut in parallel lines at opposite sides of the potato-hills, so as to loosen the soil and thereby lessen the work of the draft-animals. They also by rotating at such points form guides to deflect the soil outwardly upon the plow and toward the front end of the belt 23, as will be readily understood.

In practice as the machine is drawn across the field the potatoes and more or less dirt are gathered up by the plow or scoop and by accumulation thereon and movement of the machine the mass of potatoes and earth is engaged by the downwardly and rearwardly moving belt at its front end and is forced by the pins 24 thereof up over the rollers 29, which are rotating in the direction indicated by the arrows in Fig. 4. By the time the potatoes clear the last of the series of rollers 29 all of the loose earth has escaped between said rollers and only the lumps, if there be any, pass with the potatoes back upon the first half of the series of rollers 30, between which the smaller potatoes pass and drop into the hopper 26, while the larger potatoes and any large lumps of dirt which have not been broken or crumbled by their passage drop down between the wider-spaced rollers 30 into the hopper 43 below. The potatoes, thus graded, are delivered by their respective hoppers into the elevator-casings 37 and 44 and are conveyed upwardly therethrough by the endless belts 38 and 45, respectively, and are discharged therefrom at their upper ends into suitable boxes or receptacles placed to receive them at the rear of the machine upon the platform 63, or otherwise suitably supported. This operation is continuous as long as the machine is in motion, and in case any unusually large potatoes, lumps of earth, or rocks are gathered up by the machine they pass freely through, owing to the fact that the front and lower end of the endless conveyer or belt 23 is held downwardly by gravity alone, and therefore affords a yielding pressure. By providing this yielding belt or conveyer a large hard substance or article may pass up through the machine without injury to the latter and will be discharged, together with the mass of weeds and grass, off the rear and upper end of the series of rollers 30 and drop back upon the ground in rear of the machine, as will be readily understood.

By providing the adjustable support for the front end of the machine it is obvious that it may be adjusted to gather up potatoes planted at varying depths.

From the above description it will be apparent that I have produced a potato-digging machine which is positive and reliable and is under perfect control of the operator, who, to avoid any serious obstructions and when traveling to and from the field, grasps the lever 15, retracts the dog 17 from engagement with the sector 18, and by pressing downwardly on said lever raises the front end of the machine clear of all obstructions and locks it by engagement of said dog with the lower notch of said sector.

Various changes in the detail construction and arrangement of this machine may be made without departing from the spirit and scope of my invention.

Having thus described the invention, what I claim as new, and desire to secure by Letters Patent, is—

1. In a potato-digging machine, the combination of a wheel-supported framework, having a plow or scoop, and a potato-supporting surface, consisting of rollers properly spaced apart, with an endless conveyer, arranged entirely above the rollers, and a pivoted frame, carrying the front end of the conveyer and holding it yieldingly depressed, for the purpose set forth.

2. A potato-digging machine, comprising a suitable framework mounted upon wheels and adjustably supported at its front end, a V-shaped plow or scoop arranged forward of said support, soil-cutters arranged at opposite sides of said plow or scoop, a series of rollers journaled in the framework, a pair of guide-rollers arranged at opposite ends of said series of rollers, and in a higher plane, a frame pivoted at its rear end within said framework and carrying the front guide-roller, of said pair, and an endless conveyer superposed with relation to said series of rollers, and mounted upon said guide-rollers, substantially as described.

3. A potato-digging machine, comprising a suitable framework mounted upon wheels and adjustably supported at its front end, a V-shaped plow or scoop arranged forward of said support, soil-cutters arranged at opposite sides of said plow or scoop, a series of rollers journaled in the framework, a pair of guide-rollers arranged at opposite ends of said series of rollers, and in a higher plane, a frame pivoted at its rear end within said framework and carrying the front guide-roller of said pair, an endless conveyer superposed with relation to said series of rollers, and mounted upon said guide-rollers, a master sprocket-wheel rotating with the axle of the machine, sprocket-wheels upon the spindles of said rollers, and an endless chain connecting said master sprocket-wheel and the sprocket-wheels of said pair of rollers, and also engaging sprocket-wheels of said series of rollers, substantially as described.

4. A potato-digging machine, comprising a wheel-supported framework, having a plow or scoop at its front end, an adjustable support for the front end of said framework in rear of said plow or scoop, a series of rollers arranged closely together and journaled in said framework, a second series of rollers arranged to the rear of the first series, but disposed at greater distances apart, an endless conveyer above said rollers and working in conjunction therewith, one or more hoppers arranged below the second series of rollers adapted to receive the potatoes as they pass downward between said rollers, and means to rotate said rollers and operate said conveyer, substantially as described.

5. A potato-digging machine, comprising a wheel-supported framework, having a plow or scoop at its front end, an adjustable support for the front end of said framework in rear of said plow or scoop, a series of rollers arranged closely together and journaled in said framework, a second series of rollers arranged at the rear of the first series, but disposed at greater distances apart, an endless conveyer above said rollers and working in conjunction therewith, one or more hoppers arranged below the second series of rollers and adapted to receive the potatoes as they pass downward between said rollers, an inclined elevator casing or spout connected with each hopper at one side of the machine, and a conveyer traveling upwardly in each spout and adapted to discharge the potatoes at the upper ends thereof, substantially as described.

6. In a potato-digging machine, the combination of a wheel-supported framework having a plow or scoop, a potato supporting and grading and earth-sifting surface, and means to convey the potatoes rearwardly upon such surface, with a series of scraping-plates, and means to throw them into or out of contact with said surfaces, for the purpose set forth.

7. A potato-digging machine, comprising a wheeled framework, having a plow or scoop at its front end, and an adjustable runner in rear of said plow or scoop, an endless conveyer, a series of rollers arranged below and acting in conjunction with said conveyer, crank-shafts journal in the framework below said rollers, provided with scraping-plates for said rollers, a foot-lever mounted on the framework, a link pivotally connecting the same and said crank-shafts, and a retractile spring connected to said lever and holding said scraping-plates out of engagement with said rollers, substantially as described.

In testimony whereof I affix my signature in presence of two witnesses.

ALFRED R. GIBBONS.

Witnesses:
L. COMBS,
F. P. HOWE.